United States Patent [19]

Escher

[11] 4,023,411
[45] May 17, 1977

[54] TEMPERATURE MEASURING DEVICE

[76] Inventor: Hans Escher, 19 Trentino Road, Turramurra, New South Wales 2074, Australia

[22] Filed: Nov. 5, 1975

[21] Appl. No.: 628,985

[52] U.S. Cl. .................................. 73/349; 73/359 R
[51] Int. Cl.² ......................................... G01K 7/02
[58] Field of Search ............ 73/341, 349, 351, 359; 165/5, 11

[56] References Cited

UNITED STATES PATENTS

| | | | |
|---|---|---|---|
| 3,040,579 | 6/1962 | Taylor | 73/359 X |
| 3,183,961 | 5/1965 | Brandt | 165/5 UX |
| 3,671,329 | 6/1972 | Huff | 73/349 X |
| 3,874,239 | 4/1975 | Finney | 73/349 |

Primary Examiner—Donald O. Woodiel
Attorney, Agent, or Firm—Richard D. Emch

[57] ABSTRACT

A device for the measurement of temperature within an apparatus, for example, a heat exchanger, is disclosed. The temperature measuring device includes a conduit, one end of which extends from the apparatus. The other end is affixed within said apparatus at a point where the temperature is to be measured. Temperature sensitive means, for example, a sheathed thermocouple adapted to permit insertion from outside the apparatus, is positioned within the conduit. The thermocouple has one end positioned adjacent the measuring point.

11 Claims, 2 Drawing Figures

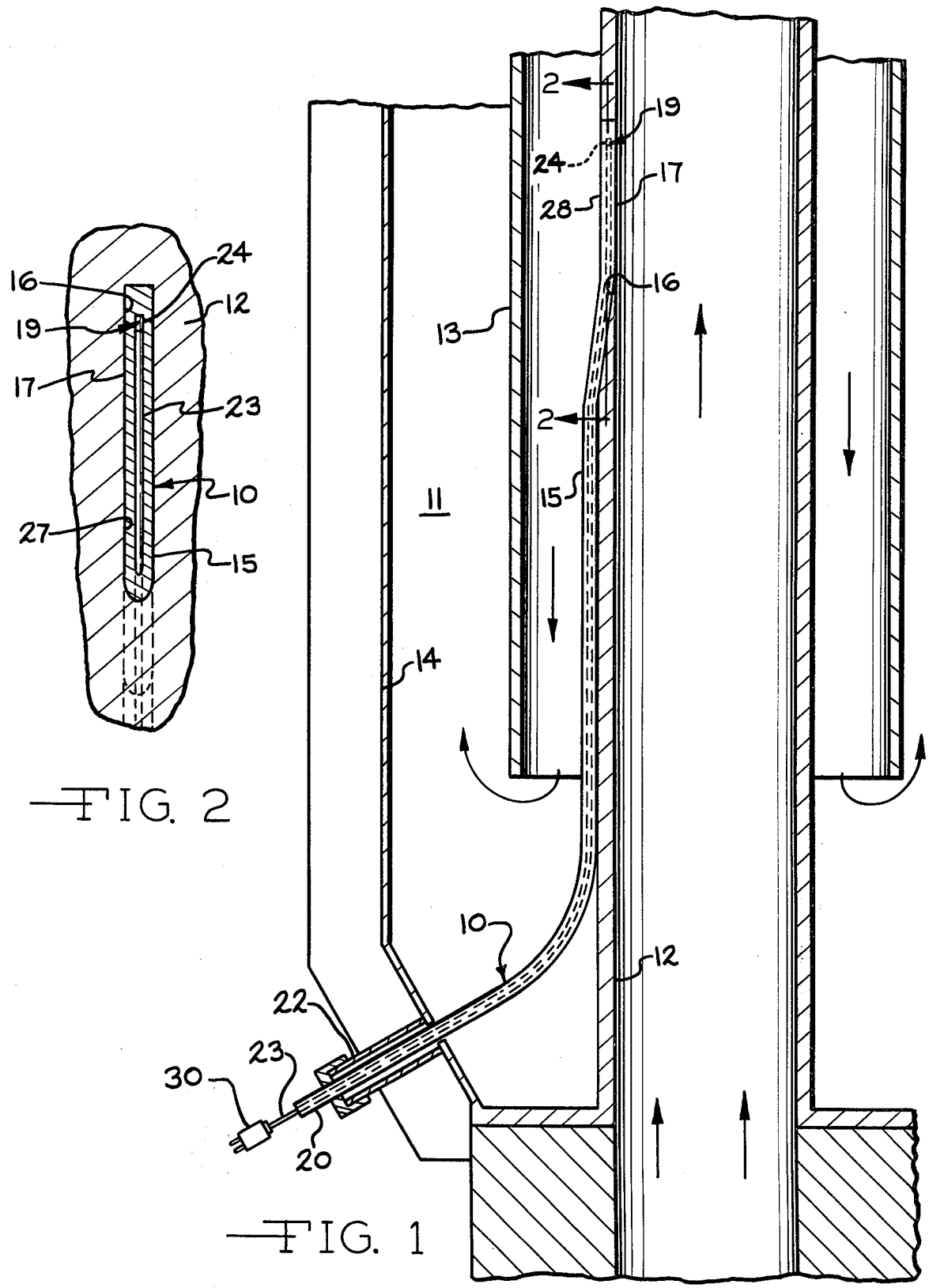

TEMPERATURE MEASURING DEVICE

BACKGROUND OF THE INVENTION

The present invention relates to temperature measuring devices and more particularly, but not exclusively, to a temperature measuring device for heat exchangers.

The temperature of heat transfer walls in heat exchangers is usually measured by thermocouples attached to the wall by welding or by inserting the thermocouple into a cavity of the wall. The accuracy of the measurement can be affected by the direct cooling or heating effect of the fluid on the thermocouple, by turbulance created at the measuring point of the thermocouple and by inadequate contact of the thermocouple tip with the wall. It is also often difficult and sometimes impossible to replace the thermocouple when the heat exchanger is in service.

The object of the present invention is to provide a temperature measuring device substantially free of the above problems.

SUMMARY OF THE INVENTION

The present invention, in a general embodiment, is a device for the measurement of temperature at a point in an internal part of an apparatus, the device comprising a conduit, one end of which extends from the apparatus and the other end of which is sealed and affixed within said part at said point. Temperature sensitive means which is adapted to permit insertion from outside the apparatus is positioned within and through the conduit and extends to the point at which a temperature measurement is required.

The present invention in another specific embodiment is a heat exchanger having an enclosure, heat transfer walls and a device for measurement of the temperature at a point in the heat transfer walls, said device comprising a fine tubular conduit, one end of which extends from the heat exchanger enclosure and the other end of which is sealed and affixed within one heat transfer wall at said point. Sealing means are provided between the enclosure and the tubular conduit. Temperature sensitive means, for example a sheathed thermocouple wire, is positioned within the conduit and is adapted for insertion from the outside of the enclosure through the conduit to the point at which a temperature measurement is required.

BRIEF DESCRIPTION OF THE DRAWINGS

FIG. 1 is a sectional view of part of a heat exchanger showing a temperature measuring device according to the present invention; and FIG. 2 is a fragmentary sectional view taken along the line 2—2 of FIG. 1.

DESCRIPTION OF THE PREFERRED EMBODIMENT

A temperature measuring device, according to the present invention, is generally indicated in FIG. 1 by the reference number 10. While the temperature measuring device 10 may be used in several different types of apparatus, where there is a need to measure temperature at a point within the apparatus, FIGS. 1 and 2 show the temperature measuring device 10 utilized in connection with a heat exchanger 11. The heat exchanger 11 includes a heat exchanger tube 12 which is concentrically positioned within another heat exchanger tube 13. Normally, the heat exchanger tubes 12 and 13 are constructed of metal, for example, a stainless steel alloy. The heat exchanger tubes 12 and 13 are positioned in such a manner as to allow heat transfer between, for example, a hot fluid such as a flue gas passing through the heat exchanger tube 12 to another lower temperature fluid such as air flowing between the concentric heat exchanger tubes 12 and 13. The heat exchanger 11 includes a heat exchanger enclosure 14 which encloses the heat exchanger tubes 12 and 13.

The temperature measuring device 10 includes a fine and smooth bore tube or conduit 15 which is preferably constructed of the same material as the heat exchanger tube 12. The heat exchanger tube 12 is provided with a groove or slot 16 which receives an offset portion 17 of the conduit 15. After the offset portion 17 is positioned within the slot 16, the conduit 15 is welded to the tube 12, as indicated in FIG. 2, so that it forms an integral part of the heat exchanger tube 12. The weld or similar connecting means seals and affixes the conduit 15 to the heat exchanger tube 12. The outer diameter of the conduit 15 is the same as or slightly less than the wall thickness of the heat exchanger tube 12, such that after welding, a smooth surface, coextensive with the surrounding wall, is defined on both sides of the heat exchanger tube 12. In the present embodiment, the temperature measuring point is indicated by the reference number 19. The conduit 15 emerges from the wall of the heat exchanger tube 12 at a position downstream of the cooling air flow located adjacent the measuring point 19. The other end 20 of the conduit 15 extends outwardly from the enclosure 14. In the present embodiment, a connector, for example a gland 22, is provided. The gland 22 accommodates differences in thermal expansion between the conduit 15 and the enclosure 14. The gland 22, therefore, serves as sealing means between the enclosure 14 and the tubular conduit 15.

A small diameter thermocouple 23, for example a compacted mineral insulated metal sheath thermocouple, is inserted and positioned within the conduit 15 so that a thermocouple tip 24 is positioned adjacent an end 26 of a cavity 27 defined by the conduit 15. Therefore, the thermocouple tip 24 is positioned adjacent the temperature measuring point 19. As shown in FIG. 2, the thermocouple 23 is located at the midposition or mid-point between the surfaces of faces 28 and 29 of the heat exchanger tube 12. This permits measurement of the mean temperature of the tube wall. It has been found that the small bore cavity 27 of the conduit 15, when filled with the thermocouple 23, has a relatively insignificant affect on the heat transfer conditions in the temperature measuring area.

A plug 30 is mounted at one end of the thermocouple 23 exterior of the heat exchanger enclosure 14. In a manner well known in the art, the plug 30 is in communication with a remote station, for example, a remote instrument or control panel which includes a temperature gauge which indicates the temperature of the measuring point 19.

The thermocouple 23 may be removed and replaced when the heat exchange 11 is still in operation. It has been found that the temperature measuring device 10 eliminates many of the problems found with prior art temperature measuring devices.

What I claim is:

1. A device for the measurement of temperature at a point in an internal part of an apparatus, such internal part having a surface adjacent such point, the temperature measuring device comprising a conduit having opposed ends, one end of said conduit extending from the apparatus and the other temperature measurement end of said conduit being affixed within said part adjacent such point, and temperature sensitive means positioned within said conduit, said temperature sensitive means being adapted to permit insertion from outside the apparatus through said conduit to such point at which a temperature measurement is required adjacent said temperature measurement end of said conduit, said temperature measurement end of said conduit having a cross-sectional dimension equal to or less than the thickness of said part and being embedded within said part, wherein said temperature measurement end of said conduit does not protrude from said surface of said internal part.

2. A device according to claim 1 wherein said temperature sensitive means is a thermocouple.

3. A device according to claim 2, wherein said thermocouple comprises a compacted mineral insulated metal sheathed thermocouple.

4. A heat exchanger having an enclosure, heat transfer walls and a device for measurement of the temperature at a point in the heat transfer walls, said device comprising a tubular conduit, one end of said conduit extending from the heat exchanger enclosure and the other temperature measurement end of said conduit being sealed and affixed within one of said heat transfer walls adjacent such point, wherein said temperature measurement end of said conduit does not protrude from said one wall, a connector between said enclosure and said tubular conduit, and temperature sensitive means removably positioned within said conduit, said temperature sensing means being adapted for insertion from the outside of said enclosure through said conduit to such point at which a temperature measurement is required adjacent said temperature measurement end of said conduit.

5. A heat exchanger, according to claim 4, wherein said temperature sensitive means comprises a thermocouple.

6. A heat exchanger, according to claim 5, wherein said thermocouple comprises a compacted mineral insulated metal sheathed thermocouple.

7. A heat exchanger, according to claim 5, wherein said temperature measurement end of said conduit includes an offset portion, one of said heat transfer walls, adjacent such point, defining a groove for receiving said offset portion of said conduit, said offset portion being sealed and affixed within such groove.

8. A heat exchanger, according to claim 7, including a plug mounted on said one end of said conduit.

9. A heat exchanger, according to claim 7, wherein said offset portion has a cross-sectional dimension the same as or less than the thickness of said one of said heat transfer walls and said thermocouple is positioned at the mid-point of said one of said heat transfer walls.

10. A heat exchanger, according to claim 7, wherein said conduit and said one of said heat transfer walls are constructed of the same metal.

11. A heat exchanger, according to claim 7, wherein said conduit emerges from said one of said heat transfer walls at a position downstream of fluid flow adjacent such point.

* * * * *